United States Patent [19]

Staudenrausch

[11] Patent Number: 5,145,451
[45] Date of Patent: Sep. 8, 1992

[54] APPARATUS FOR SEPARATING A CONTINUOUS SAUSAGE SKEIN COMING FROM A STUFFING MACHINE INTO INDIVIDUAL SAUSAGES

[75] Inventor: Georg Staudenrausch, Biberachan der Riss, Fed. Rep. of Germany

[73] Assignee: Albert Handtmann Maschinenfabrik GmbH & Co., KG, Fed. Rep. of Germany

[21] Appl. No.: 723,415

[22] Filed: Jun. 28, 1991

[30] Foreign Application Priority Data

Aug. 29, 1990 [DE] Fed. Rep. of Germany ....... 9012381

[51] Int. Cl.$^5$ ............................................. A27C 11/00
[52] U.S. Cl. ......................................... 452/48; 452/46
[58] Field of Search .................. 452/46, 47, 48, 30

[56] References Cited

U.S. PATENT DOCUMENTS

| | | | |
|---|---|---|---|
| 3,971,101 | 7/1976 | Townsend et al. | 452/48 |
| 4,418,447 | 12/1983 | Ziolko | 452/46 |
| 5,049,108 | 9/1991 | Staudenrausch | 452/48 |

*Primary Examiner*—Willis Little
*Attorney, Agent, or Firm*—Finnegan, Henderson, Farabow, Garrett & Dunner

[57] ABSTRACT

Apparatus for dividing a continuous sausage skein coming for a stuffing machine into individual sausages in which rotating V-shaped plates for constricting the skein, that are relatively thin in the area of their V cutouts compared to their remaining wall thickness, are obliquely disposed in opposite directions relative to one another so that they staggeredly interlock as they constrict the sausage skein.

8 Claims, 5 Drawing Sheets

APPARATUS FOR SEPARATING A CONTINUOUS SAUSAGE SKEIN COMING FROM A STUFFING MACHINE INTO INDIVIDUAL SAUSAGES

BACKGROUND OF THE INVENTION

This invention relates to an appartus for dividing a continuous sausage skein coming from a stuffing machine into individual sausages consisting of a device for rotating the sausage skein, a separating device for dividing the skein into individual sausages with at least two V-shaped, plate-shaped displacement elements driven rotatingly in opposite directions about one driving axis each, which are obliquely disposed in opposite directions so that the V-cutouts interlock staggeredly during the separating process and a conveyor device for the further conveying the divided sausages.

In a known device of this type (GDR-PS 247 829) the displacement elements for dividing a sausage skein into individual sausages are attached to true conveying rollers as ribs, which have a joint drive with a conveyor device so that only sausages of a given length can be produced. The displacement ribs affixed to the conveyor rollers span a relatively large passage when engaged both in an axial and in a radial direction so that some sausage meat remains in the sausage skin at the point of constriction and is lost.

The invention is based on the object of improving such a device to avoid such losses at the constrictions of the skein.

SUMMARY OF THE INVENTION

To solve this technical problem the invention provides in such an apparatus a V-shaped displacement element that is relatively thin in the area of its V-root compared to its remaining wall thickness.

With this structure for the elements, constriction of the skein is achieved in such a narrow fashion that there is no longer any sausage meat at the constriction point of the sausage covering, thus avoiding losses to a very great extent. In particular in the case of sensitive sausage coverings, a much higher portioning performance can be achieved.

The displacement elements rotate about driving axes which are disposed transverse to the direction of transport of the sausage skein, and form a unit of their own with a drive of their own, whose speed can be controlled by an electronic control unit during rotation. Thus longer or also shorter sausages can be formed depending upon the rotational speed of the displacement elements and without any losses of sausage meat at the constrictions.

So that the displacement elements can come especially close to each other during engagement in the area of their V-roots, each displacement element has according to the invention, a concave recess diagonally opposite each other in the area of the two edges adjoining the V-section and extending radially so that each element tapers from the area of the V-root up to the edge in the manner of a rolling-off surface.

Each tapered edge may have a sector-shaped recess, which is especially advantageous for displacement elements for large sausage calibres.

Irrespective of the concave recesses and the sector-shaped recesses, each displacement element may have a thickness ensuring sufficient strength so that it is also possible to produce each displacement element from plastic material. This is of great advantage both in terms of food technology and manufacturing technology. Further features and advantages of the invention will be apparent from the following description of the drawings in which two examples of an embodiment of the invention are represented.

DETAILED DESCRIPTION OF THE INVENTION

Figure 1:
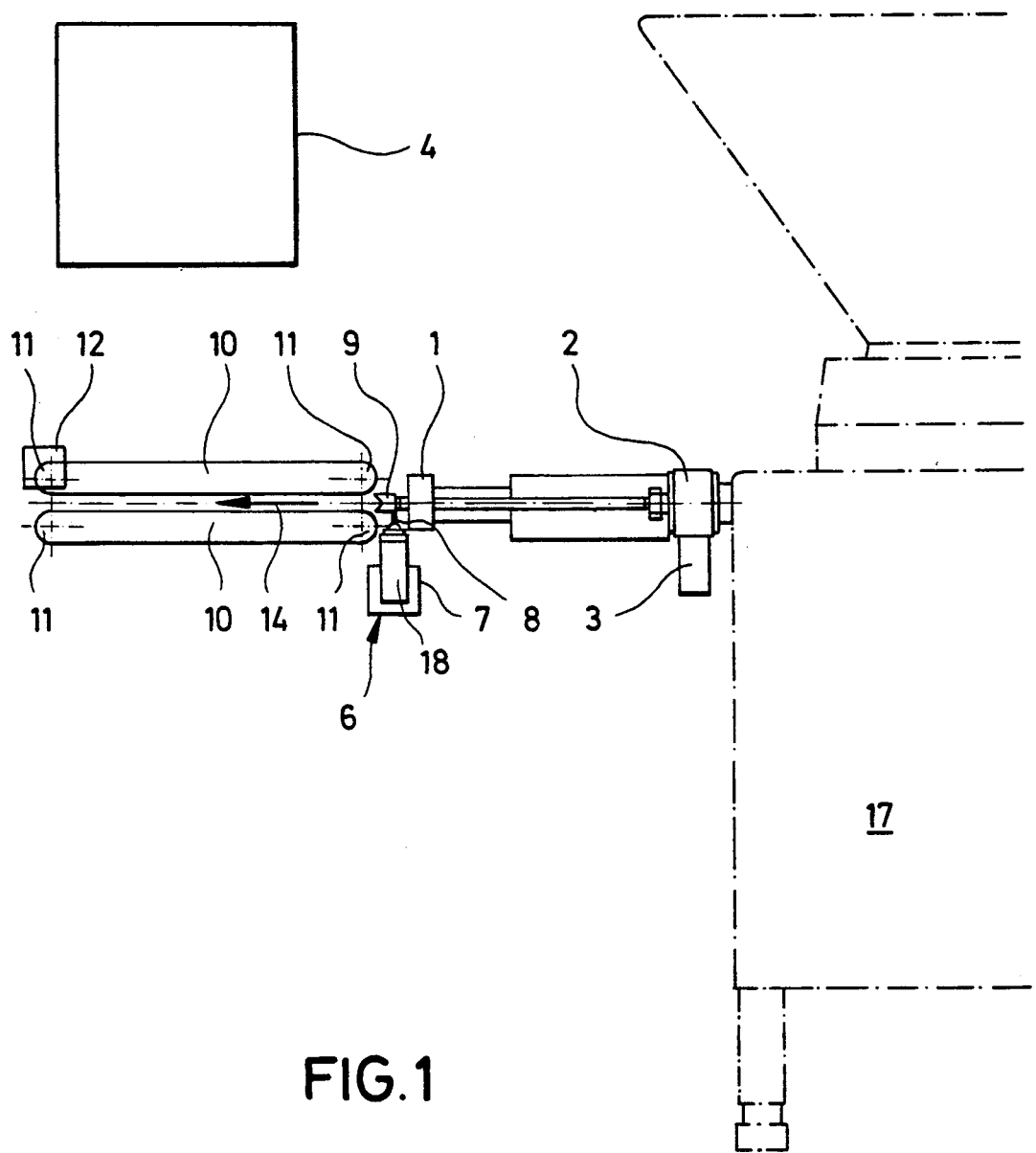
FIG. 1 is a schematic side view of the apparatus of the invention.

The stuffing machine designated 17 is represented in dash-dotted lines in FIG. 1, from which the sausage stuffing material is continuously discharged in skein shape and stuffed into the skin in a customary fashion. The sausage skein created in this fashion is conveyed through the centric opening of a brake ring 1, which is rotated by a twist-off means 2 that also rotates the sausage skein.

The twist-off means 2 is driven by an electric motor 3, the speed of which is controlled by a control means such as an electronic control unit 4.

Figure 2:
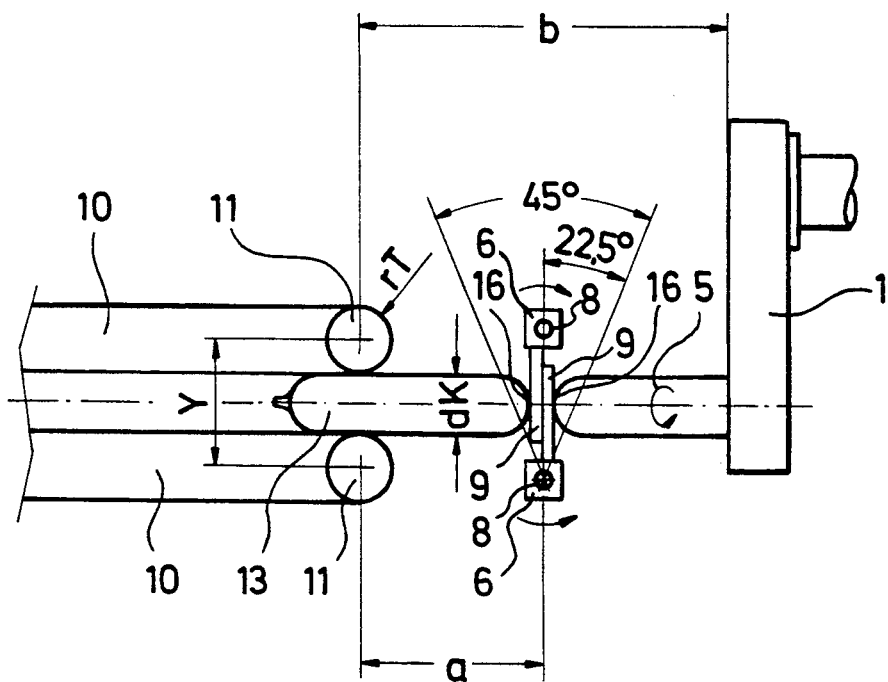
FIG. 2 is a top plan view of the apparatus with the endless belts being rotated 90° for the sake of clarity.

The sausage skein next comes to a separating device, which divides the skein into individual, but connected sausages, directly behind the brake ring 1, which consists of a displacement unit 6. This displacement unit 6 is include by an electric motor 7, which is assembled together with a transmission 18 having two driving shafts 8. (FIG. 2)

The speed of the electric motor 7 is also controlled by an electronic control unit 4.

A displacement element 9 is slipped on and rigidly located with each driving shaft 8.

A conveyor device is connected downstream of the separating device, which consists of two endless conveyor belts 10. The conveyor belts 10 are guided around pulleys 11, some of are connected as drive pulleys with a variable-speed electric motor 12, which, in turn, is controlled by the electronic control unit 4.

The conveyor belts 10 rotate in opposite directions and transport the divided sausages 13 in the direction of arrow 14.

Figure 3:
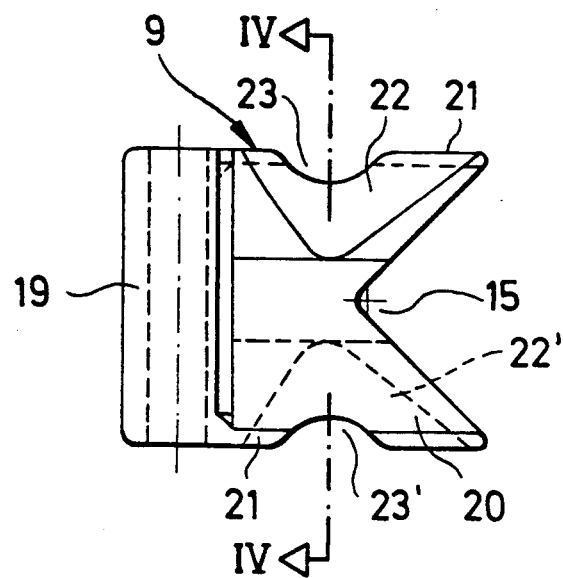
FIG. 3 is a side elevational view of a single displacement element.

Each displacement element 9 is attached in vane-shaped fashion to its associated driving shaft 8 of the transmission 18 and has a V-shaped cutout 15, the edge of which is open towards the sausage skein (FIG. 3). Each displacement element 9 has a bearing sleeve 19 with which the displacement element is slipped onto driving shaft 8 and is connected therewith in form-fit fashion.

The two driving shafts project from the transmission 18 at a distance and in parallel to each other and are driven synchronously and in opposite directions.

Each displacement element 9 has a plate-shaped blade 20, which is fastened to the bearing sleeve 19 or is manufactured with it in one piece.

Figure 5:
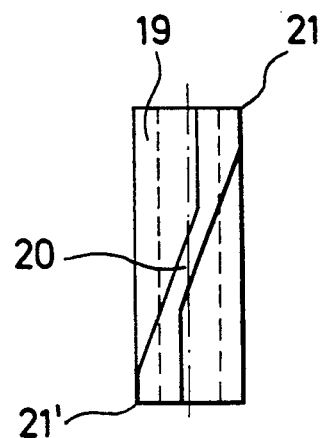
FIG. 5 is a front view of the displacement element.
Figure 7:
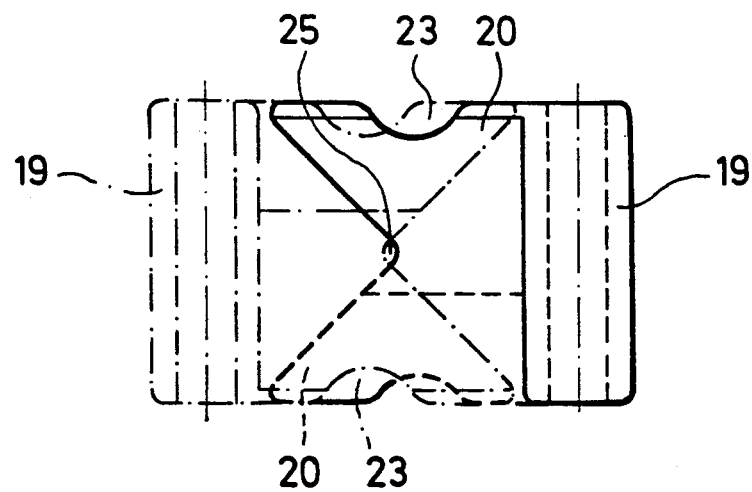

The plate-shaped blade 20 is obliquely disposed relative to the axis of the bearing sleeve 19 in such fashion that the two cooperating blades 20 interlock staggeredly in the constricting position as shown in FIG. 7. As shown in FIG. 5, which is a front view of displacement element 9, blade 20 is relatively thin in the area of the root of the V-shaped recess 15 as compared with its remaining wall thickness.

Figure 4:
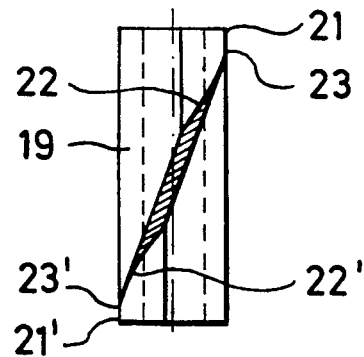
FIG. 4 is a sectional view of the displacement element taken along the line IV—IV in FIG. 3.

As shown in FIGS. 3 and 4, each displacement blade 20 has a concave recess 22 and 22' that are diagonally opposite each other in the area of the upper and lower edges 21, 21' of the plate that adjoin V-cutout 15 and extend radially so that each blade 20 tapers from the area of its V-root up to its edge 21, 21'.

As shown in FIG. 3, the concave recess 22 is located on its inner side of the blade 20 in the area of the upper edge 21, while the concave recess 22' is provided on its outer side of the blade 20 in the area of the lower edge 21'.

The upper tapered edge also has a sector-shaped recess 23 and the lower tapered edge 21' has a similar sector-shaped recess 23'.

Figure 6:
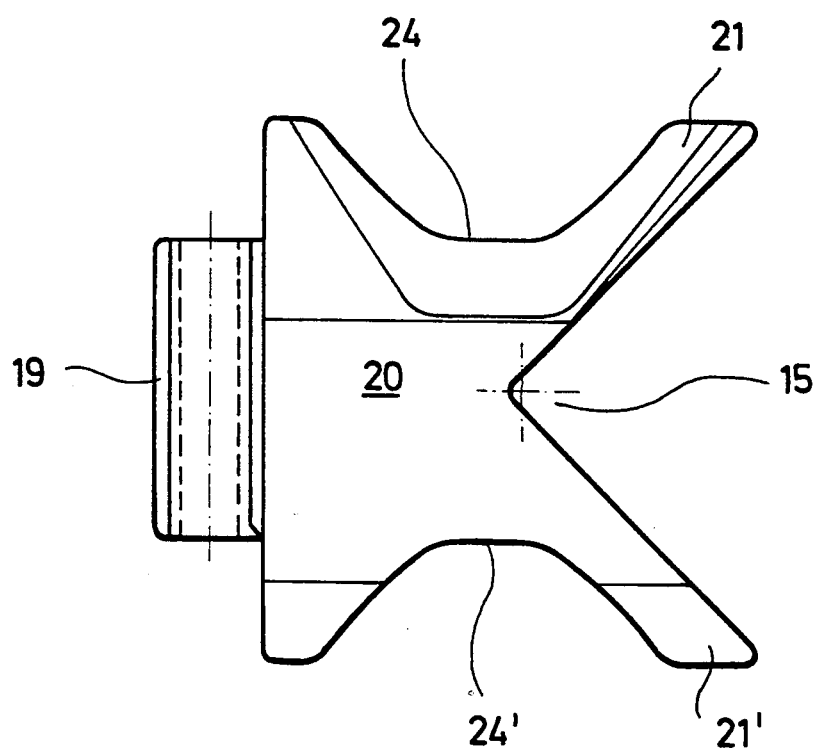
FIG. 6 is a side elevational view of a single displacement element for larger sausage calibres and FIG. 7 shows the two displacement elements in staggered position.

In the example of the embodiment according to FIG. 6, the blade 20 is designed substantially larger than in the example according to FIG. 3. Such large displacement blades are suitable for separating sausages with a large calibre of about 32 to 65 mm.

As regards its design, it essentially corresponds to the blade in FIG. 3. However, the sector-shaped recesses 24 and 24' provided on the tapered edges 21 and 21' are substantially larger than in the example according to FIG. 3.

The apparatus operates as follows:

With reference to FIG. 2, the sausage skein 5 coming from the stuffing machine is caused to rotate by the brake ring 1 which is driven via the transmission 2 by the electric motor 3 in the direction of the arrow.

The displacement elements 9 rotating synchronously and in opposite directions (as shown in FIG. 2 by the arrows) periodically engage the rotating sausage skein 5 at an angle of approximately 45° depending upon the calibre of the skein.

While the displacement elements 9 are in engagement with the sausage skein 5, their speed is controlled by the control means so that the rotary speed of their point of intersection at the point they form (passage 25 for the sausage skin) as shown in FIG. 7 corresponds substantially to the forward speed of the sausage skein 5, which is controlled by the speed of the endless belts 10.

The sausage skein 5 rotates during its constriction by the displacement elements 9 until the front end of the sausage 13 already twisted off is grasped by the endless belts 10 and a further constriction is carried out with the succeeding portion. Since the rear sausage skein continues to rotate, a twisting off of the rear end 16 of the sausage takes place.

If the displacement elements 9 rotate at a constant speed, sausages of a specific length are produced, each of which has a specific portion size of constant calibre.

If sausages with a greater length are to be produced, the electronic control unit 4 can control the rotary speed of the displacement elements 9 so that they rotate more slowly when out of engagement with the sausage skein 5, i.e. in their functionless phase.

In order to be able to produce sausages of a very great length, the rotary speed of the displacement elements 9 can be controlled up to zero during the functionless phase so that they stand still for a specific period of time. In order to nevertheless make a safe separating possible, the brake ring 1 is shut down so that the sausage skein 5 does not rotate and can therefore enter between the endless belts 10 without disturbance. Only when the displacement elements 9 constrict and thus divide the sausage skein 5, will the brake ring 1 be caused to rotate to twist off the rear end of the sausage.

If the rotary speed of the displacement elements 9 is increased during their functionless phase, shorter sausages are obtained. The smallest possible portion length depends on the distance a in FIG. 2 as a function of the radius rT of the pulleys and the length of the displacement elements 9.

If sausages of a very large calibre dK are to be produced, the displacement elements according to the design of FIG. 6 can be used. For this purpose, the displacement elements 9 according to the design of FIG. 3 are removed from their driving shafts 8 and the larger displacement elements slipped on. The brake ring must also be replaced by a larger one. The distance Y of the endless belts 18 must be increased in a known manner. The displacement unit must then of course be designed in such a way the distance between the driving shafts 8 can also be correspondingly increased.

The design of the displacement blades 20 according to FIG. 3 makes it possible to divide sausage skeins in a diameter range of about 13 mm to about 30 mm.

During the dividing process, the displacement blades rotate staggeredly within each other, so that the two roots of the V-cutouts form a very small passage 25 between them at the constriction point. This can be seen in FIG. 7. This is made possible by the fact that the blades are very thin at this point and practically approach each other up to lateral abutment. The staggered rotation of the displacement blades 20 with respect to each other is made possible by the concave recesses 22 and 22' and possibly by the sector-shaped recesses 23, 23' or 24, 24' (FIG. 6). Nevertheless, the blades have a considerable thickness in the area of their fastening point to the bearing sleeve 19 so that there is no risk of damage to them in the case of very high rotary speeds, although the stress of the blades during separating is relatively great.

Each displacement blade 20 can be manufactured from plastic material in one piece with its associated bearing sleeve 19. This is not only advantageous for reasons of food technology, but also in connection with the production of the elements, since the concave recesses in the shape of spatially arched surfaces can be easily produced by injection molding from plastic material.

Not only sausages made from sausage meat can be produced with the apparatus, but also such from other pasty compositions.

I claim:

1. Apparatus for dividing a continuous sausage skein exiting from a stuffing machine into individual sausages comprising twisting means for rotating the sausage skein, a separating device for dividing the skein into individual sausages and a conveyor means located downstream of the separating device for conveying the thus divided sausages away from the separating device, said separating device comprising at least two displacement elements mounted for rotation in opposite directions about an axis on either side of said skein and adapted to be rotated into closely spaced position relative to one another to periodically engage and thereby constrict and divide said sausage skein into individual sausages and means for rotating said elements, each of said elements having a skein engaging portion comprising a plate having a V-shaped cutout therein opening outwardly, said plates being disposed obliquely in opposite directions relative to one another as they engage the skein so that the V-shaped cutouts therein staggeredly interlock as they constrict the sausage skein and wherein the thickness of the plates in the area of the root of the V-shaped cutouts is relatively thin compared to the remaining wall thickness of the plates.

2. The apparatus of claim 1, wherein each obliquely disposed plate has the root of its V-shaped cutouts in approximately the middle of a front edge thereof and has a top and bottom edge, said plate having a concave recess extending radially of the plate on one side adjacent the top edge and on the opposite side adjacent the bottom edge, so that the plate tapers on diagonally opposite sides from the area of the root of the cutout to said edges.

3. The apparatus of claim 1, wherein each edge has a sector-shaped recess therein.

4. The apparatus of claim 1, wherein each displacement element is molded from a plastic material.

5. Apparatus for dividing a continuous sausage skein exiting from a stuffing machine into individual sausages comprising twisting means for rotating the sausage skein, a separating device for dividing the skein into individual sausages and a conveyor means located downstream of the separating device for conveying the thus divided sausages away from the separating device, said separating device comprising at least two displacement elements mounted for rotation in opposite directions about an axis on either side of said skein and adapted to be rotated into closely spaced position relative to one another to periodically engage and thereby constrict and divide said sausage skein into individual sausages and means for rotating said elements, each of said elements having a bearing sleeve mounted on a drive shaft and a skein engaging portion comprising a plate having a V-shaped cutout therein opening outwardly secured to the sleeve, said plates being disposed obliquely in opposite directions relative to one another as they engage the skein so that the V-shaped cutouts therein staggeredly interlock as they constrict the sausage skein, the thickness of the plates in the area of the root of the V-shaped cutouts being relatively thin compared to the remaining wall thickness of the plates, and control means for varying the rotational speed of the displacement elements between the time they are engaged with the continuously moving skein and the time they are disengaged therefrom to thereby vary the length of said divided sausages.

6. The apparatus of claim 5, wherein each obliquely disposed plate has the root of its V-shaped cutout in approximately the middle of a front edge thereof and has a top and bottom edge, the rear edge of the plate being connected to the bearing sleeve, said plate having a concave recess extending radially of the plate on one side adjacent the top edge and on the opposite side adjacent the bottom edge, so that the plate tapers on diagonally opposite sides from the area of the root of the cutout to said edges.

7. The apparatus of claim 5, wherein each edge has a sector-shaped recess therein.

8. The apparatus of claim 5, wherein each displacement element is molded from a plastic material.

* * * * *